US008745164B2

(12) United States Patent  
Choi et al.

(10) Patent No.: US 8,745,164 B2  
(45) Date of Patent: Jun. 3, 2014

(54) METHOD AND SYSTEM TO DETECT A CACHED WEB PAGE

(75) Inventors: Gregory Choi, San Jose, CA (US); Diego Lagunas, Los Gatos, CA (US); Sathishwar Pottavathini, San Jose, CA (US)

(73) Assignee: eBay Inc., San Jose, CA (US)

( * ) Notice: Subject to any disclaimer, the term of this patent is extended or adjusted under 35 U.S.C. 154(b) by 283 days.

(21) Appl. No.: 12/176,253

(22) Filed: Jul. 18, 2008

(65) Prior Publication Data

US 2009/0024801 A1    Jan. 22, 2009

Related U.S. Application Data

(60) Provisional application No. 60/950,774, filed on Jul. 19, 2007.

(51) Int. Cl.
*G06F 15/16* (2006.01)
*G06F 12/08* (2006.01)
*G06F 11/30* (2006.01)
*H04L 29/08* (2006.01)

(52) U.S. Cl.
CPC ........ *G06F 12/0815* (2013.01); *G06F 11/3037* (2013.01); *H04L 67/2842* (2013.01)
USPC ........................................................ 709/219

(58) Field of Classification Search
CPC ............ G06F 11/3037; G06F 12/0815; H04L 67/2842
USPC ............................ 709/213, 216, 219; 711/144
See application file for complete search history.

(56) References Cited

U.S. PATENT DOCUMENTS

| 5,821,927 | A |   | 10/1998 | Gong |
| 5,924,116 | A | * | 7/1999 | Aggarwal et al. ............. 711/122 |
| 6,094,662 | A |   | 7/2000 | Hawes |

(Continued)

FOREIGN PATENT DOCUMENTS

| WO | WO-2006033850 A2 | 3/2006 |
| WO | WO-2006033850 A3 | 3/2006 |
| WO | WO-2006055769 A2 | 5/2006 |
| WO | WO-2009014659 A1 | 1/2009 |

OTHER PUBLICATIONS

"International Application Serial No. PCT/US2008/008825, Search Report mailed Nov. 14, 2008", 4 pgs.

(Continued)

*Primary Examiner* — Peter Shaw
(74) *Attorney, Agent, or Firm* — Schwegman Lundberg & Woessner, P.A.

(57) ABSTRACT

A method and system to determine whether a web page has been cached is provided. An example system comprises a cookie generator, a cookie distributor, and a cookie evaluator. The cookie distributor may be configured to provide the code to a client system, in response to a request for web content from the client system. A value of the code to be updated at the client system in response to the client system initiating a request for the web content. The cookie evaluator may be configured to compare a value of the code to the default value. The cached status detector may be configured to use a result of the comparing to determine a cached status of the web content, the cached status to indicate whether the web content has been cached by the client system.

19 Claims, 4 Drawing Sheets

(56) References Cited

U.S. PATENT DOCUMENTS

| | | |
|---|---|---|
| 6,219,676 B1 | 4/2001 | Reiner |
| 6,314,463 B1 | 11/2001 | Abbott et al. |
| 6,366,947 B1 | 4/2002 | Kavner |
| 6,507,854 B1 | 1/2003 | Dunsmoir et al. |
| 6,625,647 B1 | 9/2003 | Barrick, Jr. et al. |
| 6,799,214 B1* | 9/2004 | Li .................................. 709/226 |
| 6,931,439 B1 | 8/2005 | Hanmann et al. |
| 7,047,281 B1 | 5/2006 | Kausik |
| 7,269,784 B1 | 9/2007 | Kasriel et al. |
| 7,330,887 B1 | 2/2008 | Dharmadhikari |
| 7,426,534 B2 | 9/2008 | Challenger et al. |
| 7,509,404 B2 | 3/2009 | Agrawal et al. |
| 2002/0099818 A1 | 7/2002 | Russell et al. |
| 2003/0065743 A1* | 4/2003 | Jenny et al. .................... 709/219 |
| 2003/0101234 A1* | 5/2003 | McBrearty et al. ........... 709/218 |
| 2003/0120752 A1 | 6/2003 | Corcoran |
| 2003/0182357 A1* | 9/2003 | Chess et al. .................... 709/203 |
| 2004/0249709 A1* | 12/2004 | Donovan et al. ................ 705/14 |
| 2005/0044321 A1 | 2/2005 | Bialkowski et al. |
| 2006/0064467 A1 | 3/2006 | Libby |
| 2006/0101341 A1 | 5/2006 | Kelly et al. |
| 2006/0106807 A1* | 5/2006 | DeVitis et al. .................. 707/10 |
| 2006/0149807 A1 | 7/2006 | Ding et al. |
| 2007/0143344 A1* | 6/2007 | Luniewski et al. ......... 707/104.1 |
| 2007/0150822 A1 | 6/2007 | Mansour et al. |
| 2008/0155056 A1 | 6/2008 | Zimowski |

OTHER PUBLICATIONS

"International Application Serial No. PCT/US2008/008825, Written Opinion mailed Nov. 14, 2008.", 4 pgs.

"WebPage Size Calculator 1.0", http://www.topshareware.com/WebPage-Size-Calculator-download-51331.htm, (Apr. 9, 2007)

* cited by examiner

METHOD AND SYSTEM TO DETECT A CACHED WEB PAGE

RELATED APPLICATIONS

This application is related to and hereby claims the priority benefit of U.S. Provisional Patent Application No. 60/950,774 filed Jul. 19, 2007 and entitled "METHOD AND SYSTEM TO DETECT WHETHER A WEB PAGE HAS BEEN CACHED", which application is incorporated herein by reference in its entirety.

TECHNICAL FIELD

This application relates to a method and system to detect whether a web page has been cached.

BACKGROUND

In the context of web application development and testing, it may be desirable to determine how fast can a web page be loaded in response to a user's request. For example a method for testing web-based applications may include measuring the response time of one or more web pages. Specifically, after the loading of a web page is initiated, an event is received indicating preparation to navigate to the web page and a timer mechanism is started. Another event is received indicating that the web page has completed loading and the timer mechanism is stopped and the elapsed time for the web page to load is determined by accessing the timer readings. This method does not distinguish between loading a web page for the first time and loading a web page that was previously cached at the client system associated with the requesting user. A web page sent from the server computer (server) typically behaves in the same manner as a cached web page does.

BRIEF DESCRIPTION OF DRAWINGS

Embodiments of the present invention are illustrated by way of example and not limitation in the figures of the accompanying drawings, in which like references indicate similar elements and in which.

DETAILED DESCRIPTION

Figure 1:
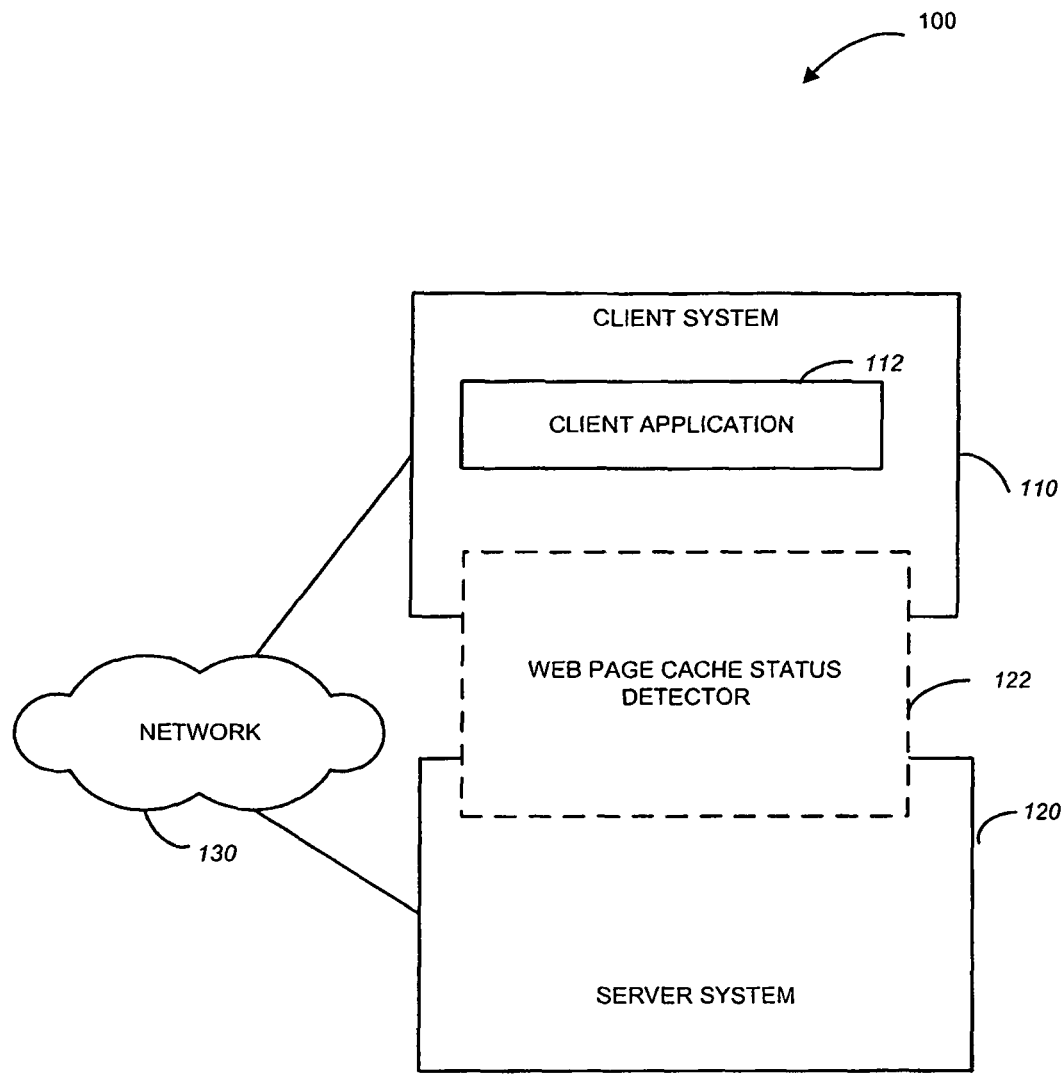
FIG. 1 is a block diagram showing a network environment within which a method and system to detect whether a web page has been cached may be implemented.

A method and system to detect whether a web page has been cached is described. In the following description, for purposes of explanation, numerous specific details are set forth in order to provide a thorough understanding of an embodiment of the present invention. It will be evident, however, to one skilled in the art that the present invention may be practiced without these specific details.

In one example scenario, in order to evaluate network latency, an approach may be pursued where the network latency is reflected in a value associated with the time duration it takes for a web page or any web content to load in response to a request. Example operations that may be utilized to perform this task are listed below.

1. Upon request, take the current time of the request (t1), and insert this time stamp as apart of the generated web page.
2. On the browser, take a time stamp at the beginning of the rendering of the web page (c1), and at the end of the rendering of the web page (c2).
3. After the page loads, send to the server, e.g., through an image tag, the values of t1 and (c2−c1).
4. On the server, record the new current time (t2) and subtract the (t2) from (t1) to get the end to end time. Then perform a calculation as follows (t2−t1)−(c2−c1), which reflects network latency.

The approach described above may be beneficial in cases of normal web page execution. When a page that is being served is a cached web page, (e.g., the web page is being served in response to a user activating the "back" control button on the browser), t1 represents the cached t1 time. This would affect the result in the end to end result calculation.

In order to determine whether a page that has been loaded is a cached web page, an approach has been provided that uses web cookies, which is described below. Hypertext Transfer Protocol (HTTP) cookies, referred to as web cookies or merely cookies, are server generated identifiers stored on the computer of the person browsing the web, which are sent to the server with each request. In one example embodiment, a specified cookie (e.g., a code) may be set on the server to a default value for every request to access a particular web page. On the client, for every request to access the web page, the default value of the specified cookie is being modified. On the client, if the read cookie value is different from the default value stored on the server, it is concluded that the web page never hit the server, and therefore has been cached. Another way to describe this approach is as follows.

On the server for every request, we set a specified cookie to its default value and on the client we modify this value. On the client, if the read cookie value is not the default value, we know the page never hit the server, and therefore has been cached.

In one example embodiment, the method and system to determine whether a web page has been cached may be utilized as described below. Suppose an advertisement from a 3rd party is served up on a web given page. For every request for the web page, a unique identifier (e.g., generated on the client) may be added to the query string of the call in order to ensure that the advertisement call (ad request) is not cached. The result is that, even on cached web pages, the new advertisement call would have a new identifier, making it appear as if a new request has been made, which affects metrics. With the above solution, in one example embodiment, the identifier may be saved in the cookie. New requests would wipe out this value. If it is determined that this value is present, the cached identifier may be used with the ad request so that the server side could identify which calls are new and which calls are cached.

Example system to detect whether a web page has been cached may be described with reference to a network environment 100 illustrated in FIG. 1. The network environment 100 may include a client system (or client) 110 and a server system (or server) 120. The client system 110 and the server system 120 may be in communications with each other via a network 130. The communications network 130 may be a public network (e.g., the Internet, a wireless network, a public switched telephone network (PSTN), etc.) or a private network (e.g., LAN, WAN, Intranet, etc.). Also shown in FIG. 1 is a web page cache status detector 122. The web page cache status detector 122 may reside at the server system 120, at the client system 110, or be distributed between the server system 120 and the client system 110. The client system 110 is shown to host a client application (e.g., a web browser application) 112. The web page cache status detector 122 may be utilized to determine whether a web page that is a subject of information being gathered at the server system 120 has been cached by the client system 110. Example embodiment of a system to detect whether a web page has been cached may be described with reference to FIG. 2.

Figure 2:
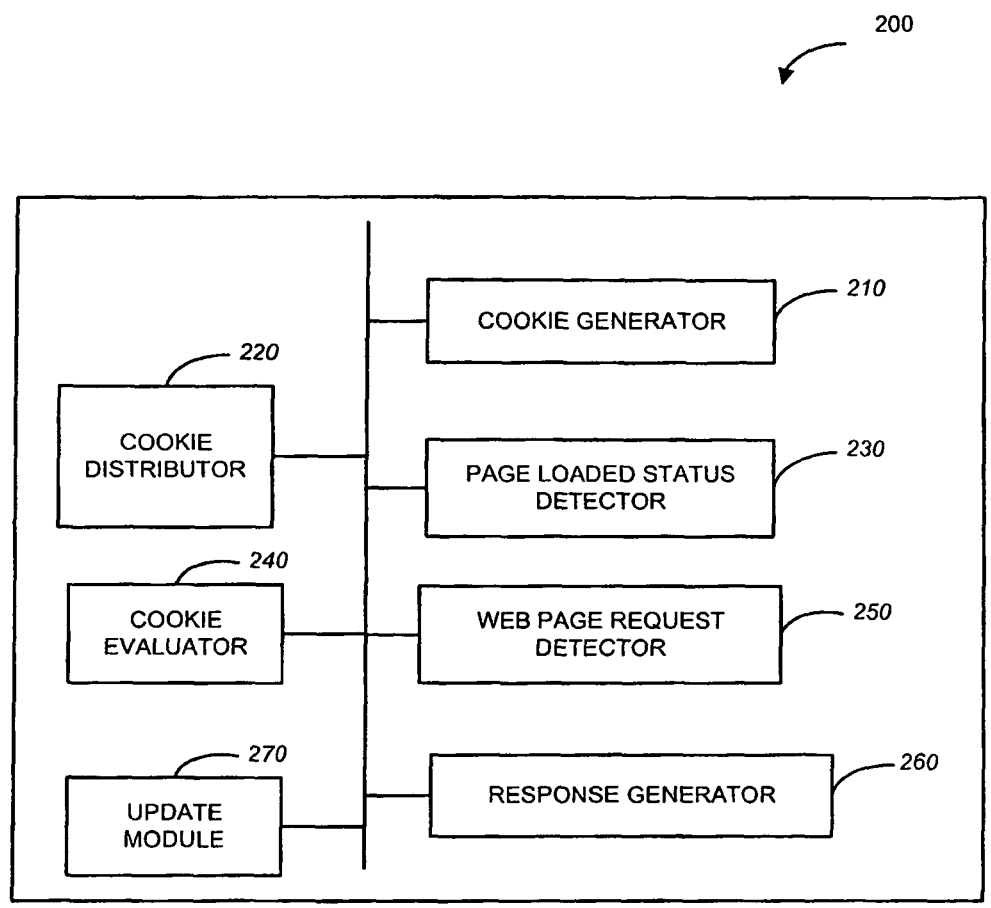
FIG. 2 is a block diagram illustrating a system to detect whether a web page has been cached, in accordance with an example embodiment.

FIG. 2 is a block diagram illustrating a system 200 to determine whether a web page has been cached, in an example embodiment of the web page cache status detector 122 shown in FIG. 2. The system 200 comprises a cookie generator 210 to generate HTML cookies, the cookie distributor 220 to store cookies at one or more client systems, and a so-called page loaded status detector 230 that determines whether a web page has been loaded at the client, and a cookie evaluator 240 to use cookies to determine whether a web page that has been loaded at the client was loaded from the server or from the client's cache. The system 200 further comprises a web page request detector 250 to receive a request for a web page from a client, and a response generator 260 to provide the requested web page to the client together with an instruction to update the value of the cookie stored at the client to the default value. In some embodiments, a default value of the cookie may be updated by an update module 270. Example operations performed by the web page cache status detector 122 may be discussed with reference to FIG. 3

Figure 3:
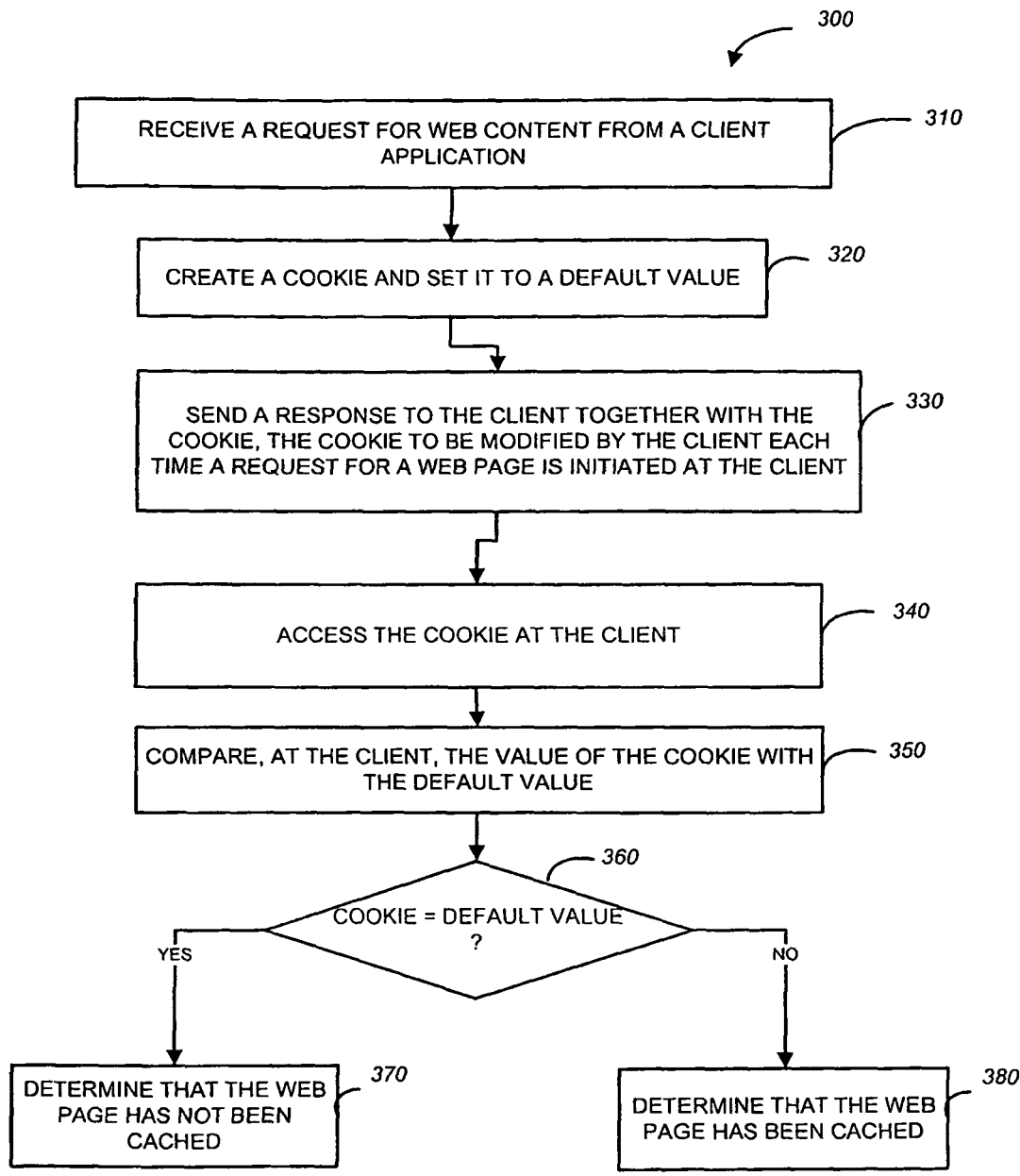
FIG. 3 is a flow chart illustrating a method to detect whether a web page has been cached, in accordance with an example embodiment.

FIG. 3 is a flow chart of a method 300 to determine whether a web page has been cached, according to one example embodiment. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 shown in FIG. 2.

As shown in FIG. 3, the method 300 commences at operation 310, where the web page request detector 250 of FIG. 2 received a request for web content from a client application. At operation 320, the cookie generator 210 of FIG. 2 creates a cookie at a server system and sets the cookie to a default value. The method 300 may utilize the cookie distributor 220 of FIG. 2 and the response generator 260 of FIG. 2 send the response to the request for the web content and to store the cookie at the client system, at operation 330. The stored cookie is to be modified at the client system each time a request for a web page is initiated at the client. There are numerous ways in which the value of the cookie can be modified. For example, the value may be incrementally increased, decreased, or set to a randomly generated value.

At operation 340, the cookie is accessed at the client system. At operation 350, the cookie evaluator 240 of FIG. 2, compares the value of the cookie received with the response to the request for the web content. If it is determined, at operation 380, that the two values match, the method 300 determines, at operation 370, that the web page has not been cached. Such determination may be made because, as described above, while each time a request for the web page is initiated, the value of the cookie at the client is updated, each time the web page is provided to the client from the server, the value of the cookie at the client is updated to a predetermined default value. If it is determined, at operation 360, that the two values are distinct from each other, the method 300 determines, at operation 380, that the web page has been cached, because it indicates that while the web page has been loaded, the client did not receive an instruction to update the value of the cookie.

Figure 4:
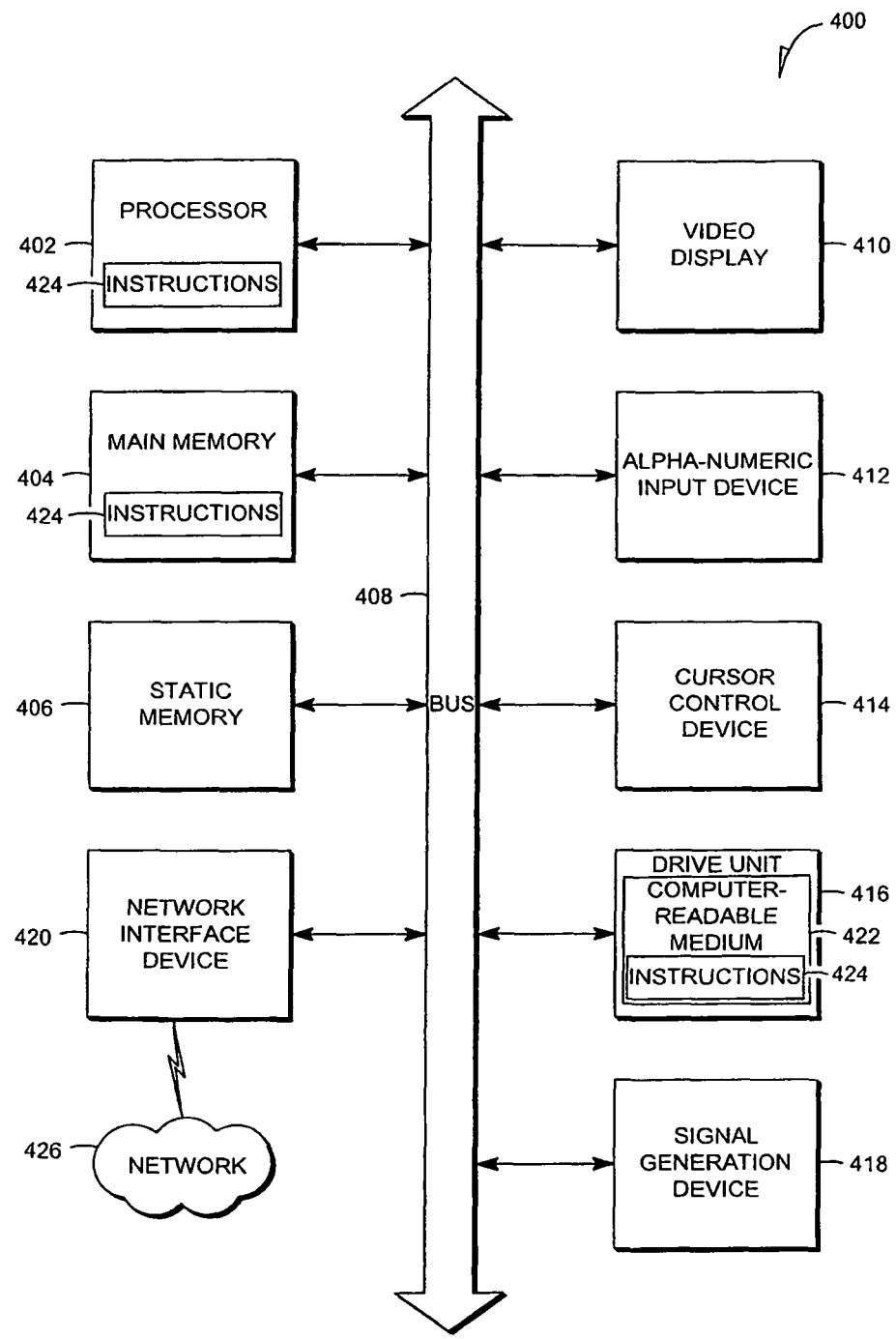
FIG. 4 illustrates a diagrammatic representation of an example machine in the form of a computer system within which a set of instructions, for causing the machine to perform any one or more of the methodologies discussed herein, may be executed.

FIG. 4 shows a diagrammatic representation of machine in the example form of a computer system 400 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an MP3 player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 408. The computer system 400 may further include a video display unit 440 (e.g., a liquid crystal display (LCD) or a cathode ray tube (CRT)). The computer system 400 also includes an alphanumeric input device 442 (e.g., a keyboard), a user interface (UI) navigation device 444 (e.g., a mouse), a disk drive unit 446, a signal generation device 448 (e.g., a speaker) and a network interface device 420.

The disk drive unit 446 includes a machine-readable medium 422 on which is stored one or more sets of instructions and data structures (e.g., software 424) embodying or utilized by any one or more of the methodologies or functions described herein. The software 424 may also reside, completely or at least partially, within the main memory 404 and/or within the processor 402 during execution thereof by the computer system 400, the main memory 404 and the processor 402 also constituting machine-readable media.

The software 424 may further be transmitted or received over a network 426 via the network interface device 420 utilizing any one of a number of well-known transfer protocols (e.g., HTTP).

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals. Such medium may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A system comprising:
   a memory;
   one or more processors coupled to the memory;
   a cookie generator to:
      create a code on a server system, and
      set a value of the code to a default value;
   a cookie distributor to provide the code to a client system as a cookie code, in response to a request for web content from the client system, a value of the cookie code to be updated at the client system in response to the client system initiating a request for the web content;
   a cookie evaluator to compare the value of the cookie code to the default value;
   cached status detector to use a result of the comparing to determine, using the one or more processors, a cached status of the web content that was loaded at the client system in response to the request, the cached status to indicate whether the loaded web content has been cached by the client system;
   a web content request detector to receive, from the client system, a request for the web content; and
   a response generator to provide the requested web content to the client system together with a request to set the cookie code at the client system to an updated value.

2. The system of claim 1, wherein the code is a web cookie.

3. The system of claim 1, wherein the updated value is the default value.

4. The system of claim 1, further comprising an update module to update the default value to a new default value wherein the updated value is a new default value.

5. The system of claim 1, wherein the web content includes a third party content, the third party content is associated with an identifier, the identifier to be saved in the cookie code.

6. The system of claim 5, comprising:
   a web content request detector to receive, from a client system, a request for the web content; and
   a response generator to provide the requested web content to the client system together with a request to erase the identifier from the cookie code.

7. The system of claim 1, wherein the web content loaded status detector is to send to the client system a request to load the web content.

8. The system of claim 1, wherein the code evaluator is to:
   determine that a value of the cookie code matches the default value; and
   conclude that the web content has not been cached by the client system.

9. The system of claim 1, wherein the code evaluator is to:
   determine that a value of the cookie code is distinct from the default value; and
   conclude that the web content has been cached by the client system.

10. A method comprising:
    creating a code on the server system;
    setting a value of the code to a default value;
    providing the code to a client system as a cookie code, in response to a request for web content from the client system, a value of the cookie code to be updated at the client system in response to the client system initiating a request for the web content;
    receiving, from the client system, a request for the web content;
    providing the requested web content to the client system together with a request to set the cookie code at the client system to an updated value;
    comparing the value of the cookie code to the default value;
    using a result of the comparing to determine a cached status of the web content that was loaded at the client system in response to the request, the cached status to indicate whether the loaded web content has been cached by the client system.

11. The method of claim 10, further comprising:
    receiving a request for the web content; and
    providing the web content to the client system.

12. The method of claim 10, wherein the updated value is the default value.

13. The method of claim 12, further comprising updating a value of the code on the server system to a new default value, wherein the updated value is the new default value.

14. The method of claim 10, wherein the web content includes a third party content, the third party content being associated with an identifier, the identifier to be saved in the cookie code at the client system.

15. The method of claim 10, wherein the operation to determine a cached status of the web content comprises:
    determining that a value of the cookie code matches the default value; and
    generating an indication that the web content has not been cached by the client system.

16. The method of claim 10, wherein the operation to determine a cached status of the web content comprises:
    determining that a value of the cookie code is distinct from the default value; and
    generating an indication that the web content has been cached by the client system.

17. The method of claim 10, wherein a value of the cookie code to be updated at the client system by incrementally increasing the value of the code in response to the client system initiating a request for the web content.

18. The method of claim 10, wherein a value of the cookie code to be updated at the client system by incrementally decreasing the value of the cookie code in response to the client system initiating a request for the web content.

19. A machine-readable non-transitory storage medium having instruction data to cause a machine to:
    create a code on the server system;
    set a value of the code to a default value;
    provide the code to a client system as a cookie code, in response to a request for web content from the client system, a value of the cookie code to be updated at the client system in response to the client system initiating a request for the web content;
    receive, from the client system, a request for the web content;
    provide the requested web content to the client system together with a request to set the cookie code at the client system to an updated value;
    compare the value of the cookie code to the default value; and use a result of the comparing to determine a cached status of the web content that was loaded at the client system in response to the request, the cached status to indicate whether the loaded web content has been cached by the client system.

\* \* \* \* \*